Nov. 28, 1961    C. C. WILSON ET AL    3,010,508
APPARATUS FOR MAKING COMPOSITE STRUCTURES
Filed July 25, 1958

INVENTORS
CHARLES C. WILSON
and ELI HUGH MC. ANGUS

BY Cushman, Darby & Cushman
ATTORNEYS

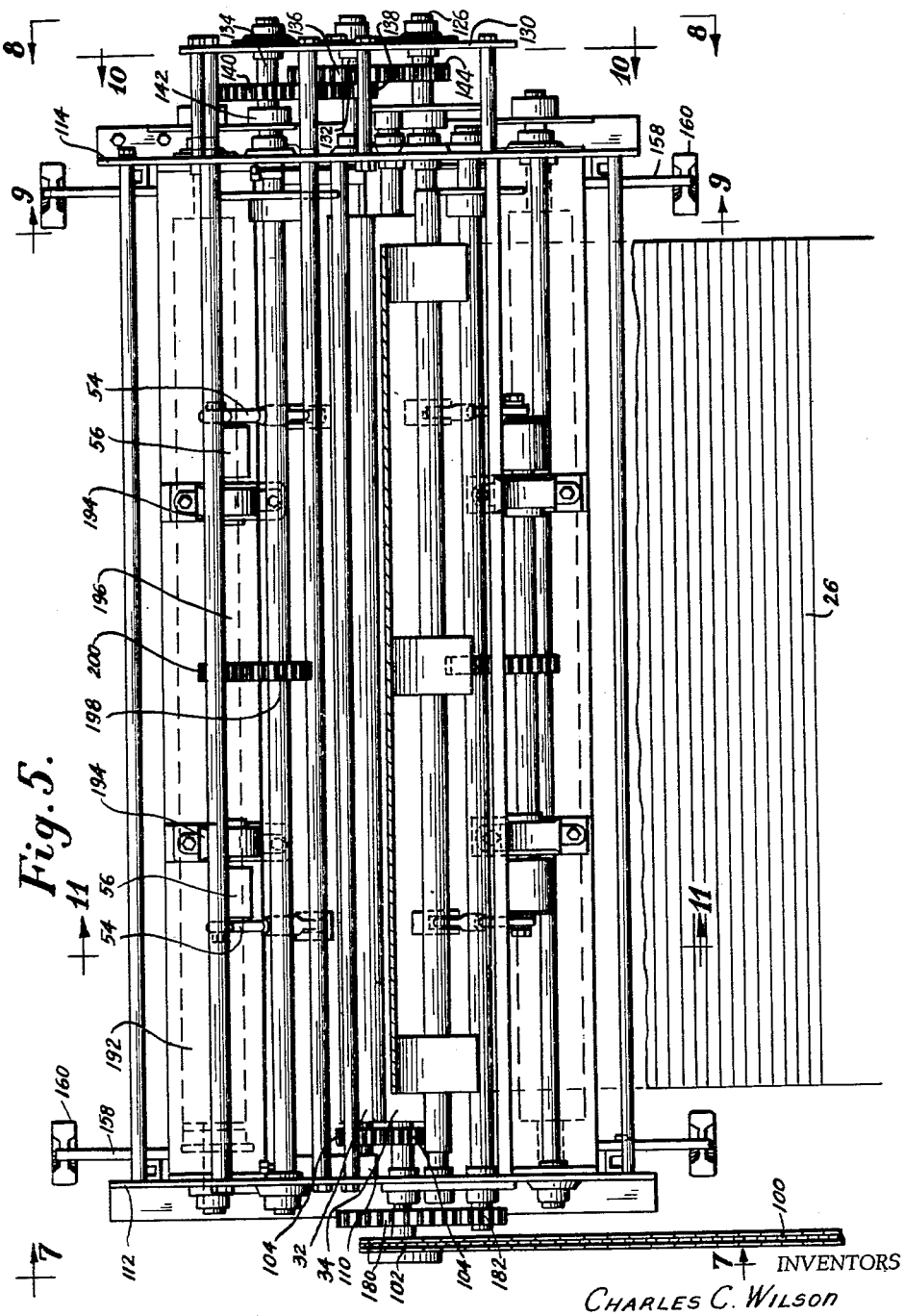

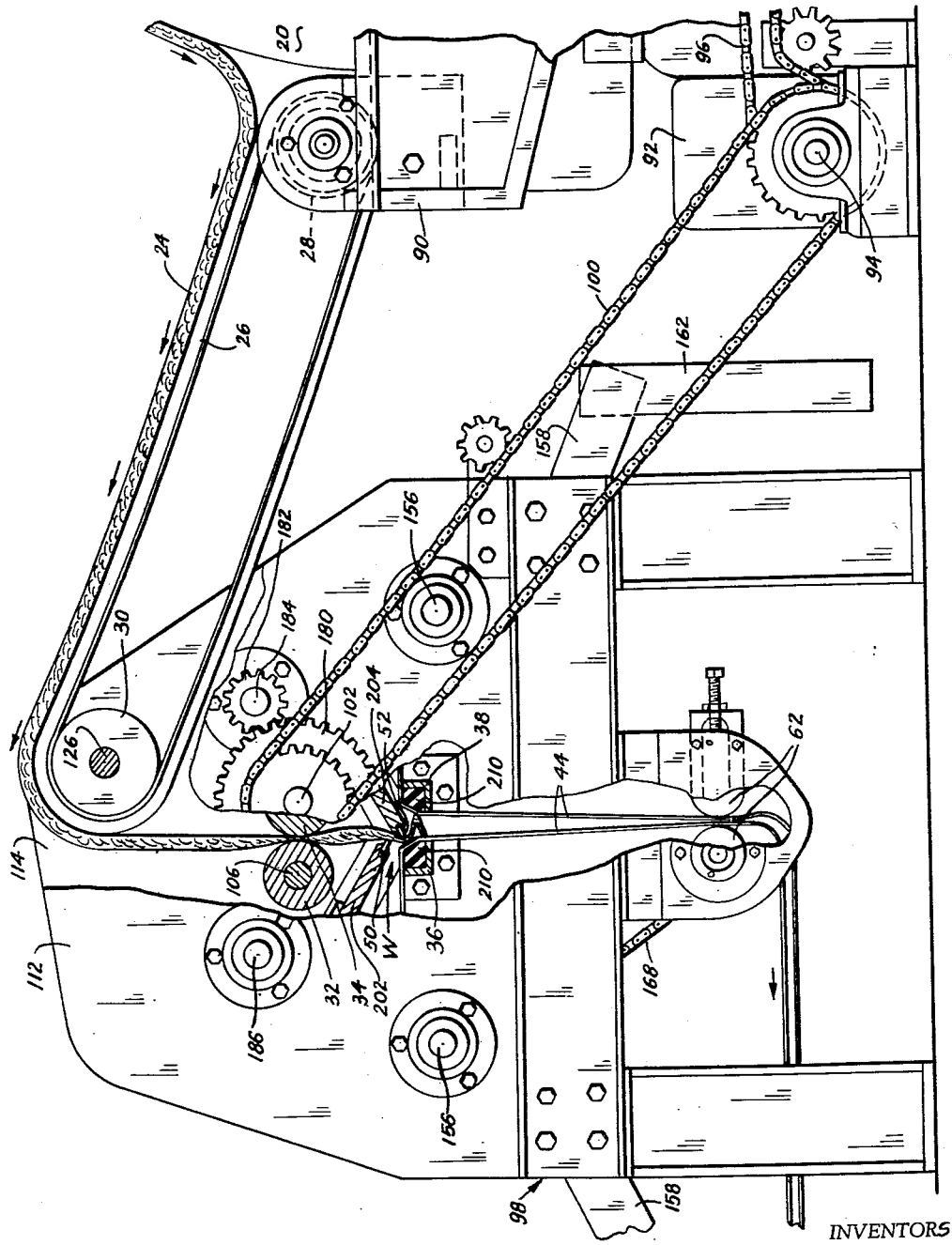

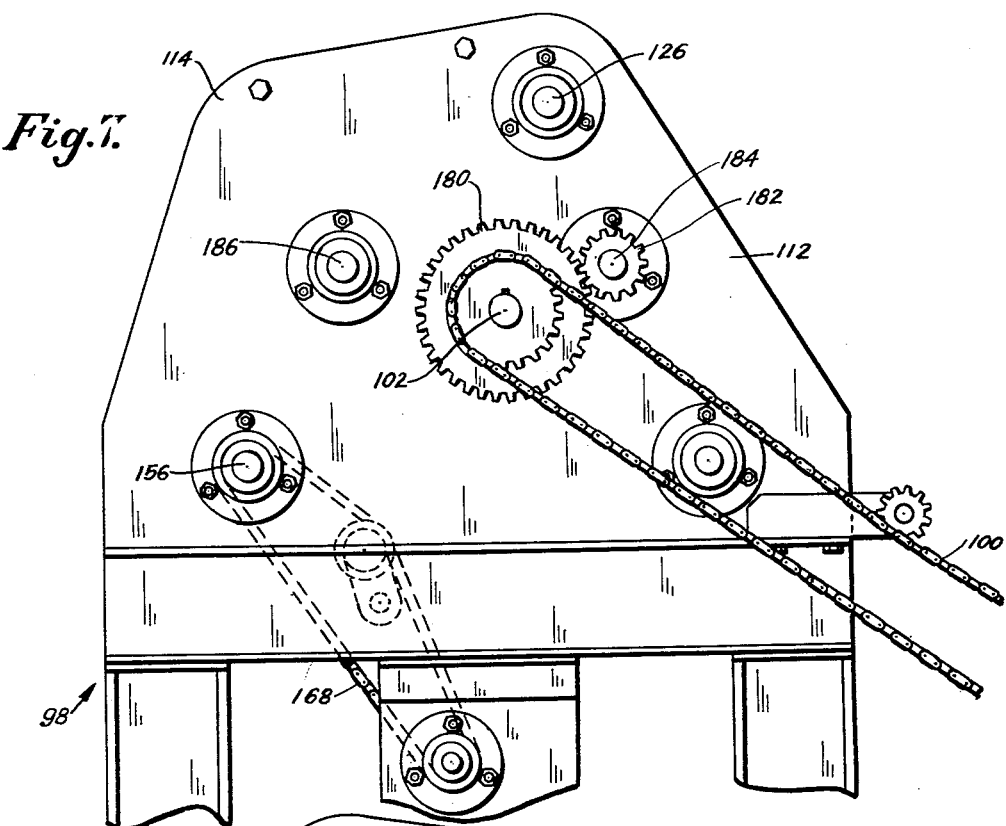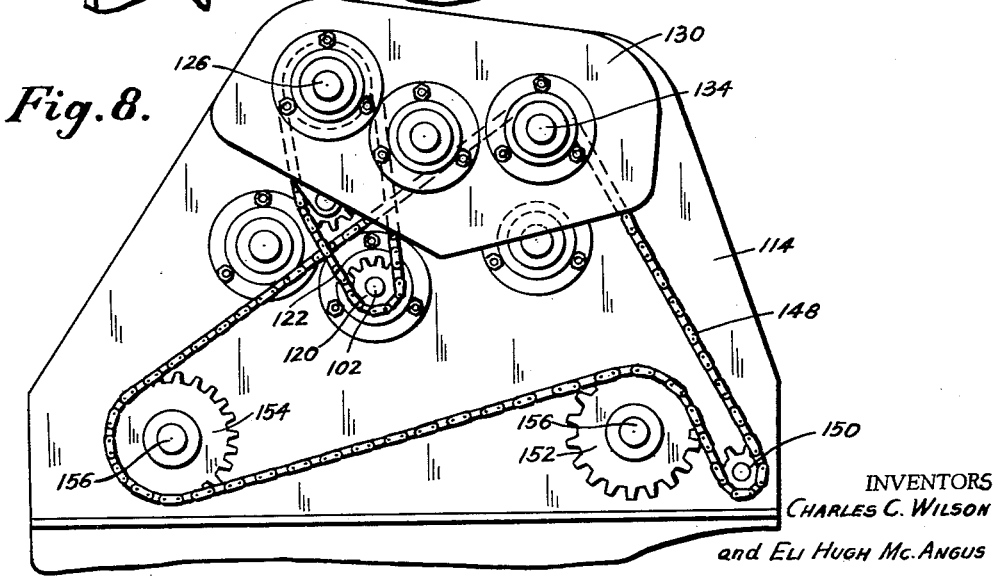

Nov. 28, 1961    C. C. WILSON ET AL    3,010,508
APPARATUS FOR MAKING COMPOSITE STRUCTURES
Filed July 25, 1958    6 Sheets-Sheet 5
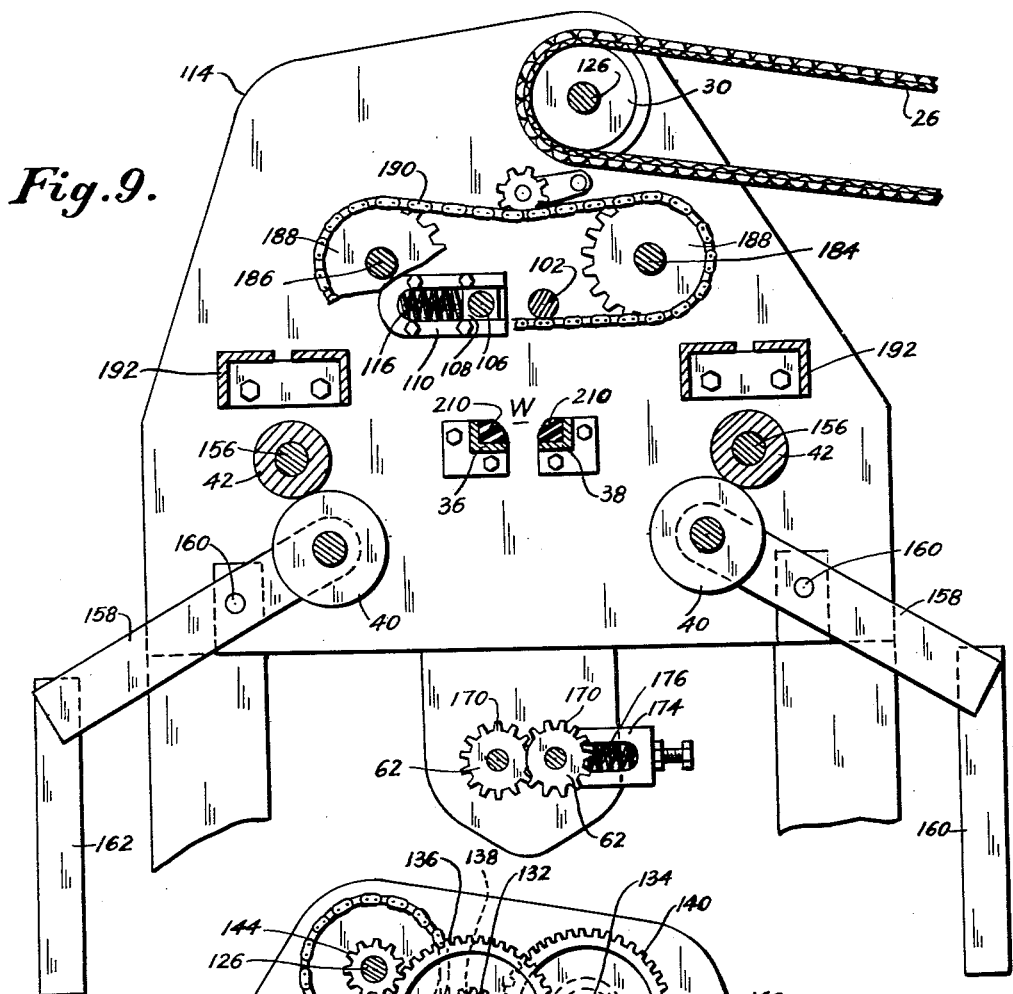
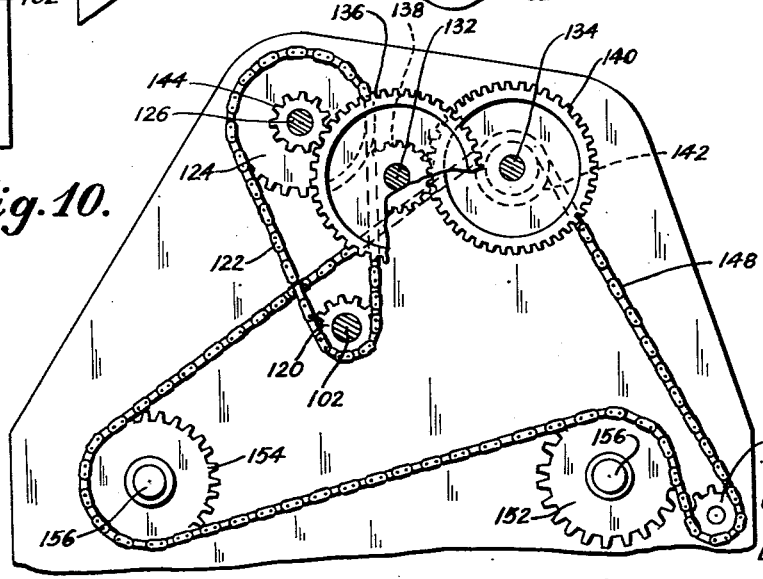
INVENTORS
CHARLES C. WILSON
and
ELI HUGH MC. ANGUS
BY Cushman, Darby & Cushman
ATTORNEYS INVENTORS
CHARLES C. WILSON
and ELI HUGH MC. ANGUS BY Cushman, Darby & Cushman
ATTORNEYS

United States Patent Office 3,010,508
Patented Nov. 28, 1961

3,010,508
APPARATUS FOR MAKING COMPOSITE STRUCTURES
Charles C. Wilson, Lanett, Ala., and Eli H. McAngus, West Point, Ga., assignors to West Point Manufacturing Company, West Point, Ga., a corporation of Georgia
Filed July 25, 1958, Ser. No. 750,955
8 Claims. (Cl. 156—459)

This invention relates to methods and apparatus for making composite structures, and in particular to the manufacture of laminated heat insulating material. A principal object of the invention is the provision of methods and apparatus for continuously advancing adhesive coated backing sheets to a work station whereat a flexible filling sheet is folded into pressure, adhering contact with the backing sheets alternately, to produce a composite structure wherein the filling sheet is adhered alternately to the backing sheets and extends therebetween in zigzag fashion. A preferred example of the invention involves the use of a relatively heavy cotton card web as the filling sheet, the card web being adhered alternately to adhesive surfaced paper backing sheets to produce a heat insulating structure of unique properties. The composite structure is efficient, inexpensive and durable, and may be collapsed and/or compressed to a small fraction of its normal volume for storage and shipment. The method and apparatus are particularly adapted for association with a conventional cotton card.

Further objects of the invention are to provide methods and apparatus for high speed and economical manufacture of pile fabrics, by further processing of the composite structures produced as above described. The filling sheet, for example, may be a layer of parallel continuous yarns, and the yarn layer folds of the composite subsequently severed between the backing sheets, each backing sheet retaining a pile of cut yarns extending from one surface thereof. Further objects will be in part evident and in part pointed out hereinafter.

The invention and the novel features thereof may best be made clear from the following description and the accompanying drawings, in which:

FIGURE 5 is a top plan view of a preferred apparatus constructed in accordance with the present invention;

FIGURE 6 is a general side elevational view, partly broken away, of the apparatus of FIGURE 5, looking toward the left hand side thereof;

FIGURE 7 is an elevational view taken substantially on the line 7—7 of FIGURE 5;

FIGURE 8 is an elevational view taken substantially on the line 8—8 of FIGURE 5;

FIGURE 9 is a sectional view taken substantially on the line 9—9 of FIGURE 5;

FIGURE 10 is a sectional view taken substantially on the line 10—10 of FIGURE 5.

Figure 1:
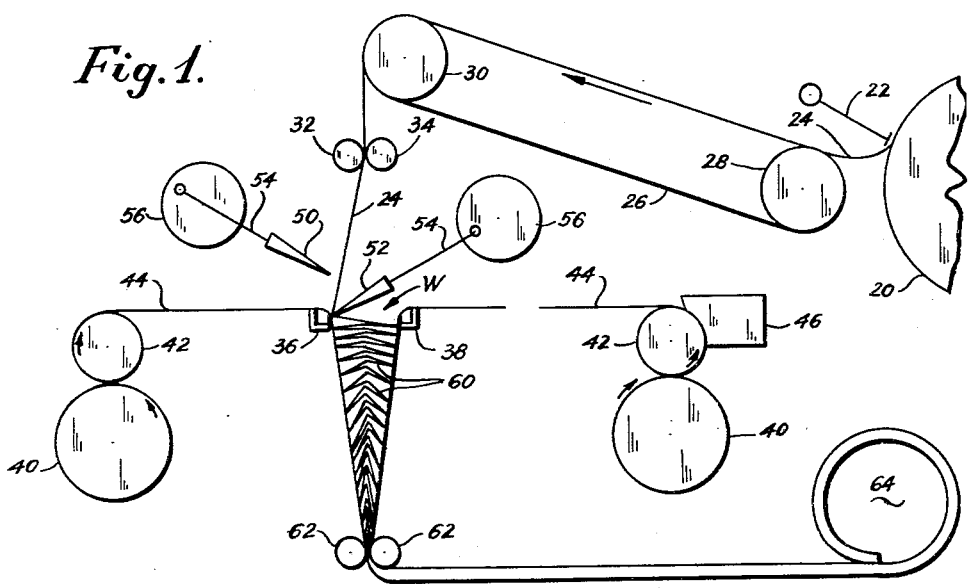
FIGURE 1 is a diagrammatic illustration of an exemplary embodiment of the invention.

Referring to the drawings, in FIGURE 1 is illustrated a card doffer cylinder 20, comb 22, and card web 24 extending therefrom. A continuous conveyor 26, extending between rollers 28 and 30, is disposed adjacent the delivery end of the card doffer, and carries the web 24 to a position above the coacting pressure rolls 32, 34, which condense the web and guide it to the work station W therebelow. At the station W backing members 36 and 38 are disposed in spaced alignment and generally facing arrangement. Associated with each backing member is a stock roll 40 and feed roll 42, each feed roll being adapted to feed a backing sheet 44 from the adjacent stock roll to and over the associated backing member. The backing sheets 44, it will be understood, are adhesive coated, each passing over its backing member with adhesive surface uppermost. The stock roll 40 may comprise paper backing coated with pressure sensitive adhesive, or, as indicated at the right of FIGURE 1, the stock roll may comprise ordinary high strength paper to which adhesive is applied prior to arrival at the work station W, as by the applicator 46 associated with the right hand feed roll 42. The backing sheets 44 may be any suitable sheet or web material, including woven and unwoven fabric, plastic film and the like.

Substantially above the backing members blades 50 and 52 are reciprocally mounted. Each blade is driven through a link 54 by an eccentric 56, the blade being guided for movement in an inclined path from a retracted position remote from the opposed backing member to a forward position in pressure contact with the opposed backing member. As shown in FIGURE 1, blade 50 is in withdrawn position remote from backing member 38 and blade 52 is in forward position in pressure contact with backing members 36. As will be described in greater detail, the blades 50, 52 are operatively linked to advance alternately, whereby they function to fold the web 24 passing therebetween alternately into pressure contact with the respective adhesive surfaced backing sheets as they pass over the backing members, whereby the web is adhered alternately to the backing sheets to form a series of zigzag folds 60 extending therebetween. The feed of backing sheets 44 and the operation of the blades 50 and 52 must of course be coordinated with the feed of the filling sheet, taking into consideration the spacing between the backing members and related factors. The composite structure so formed is led and compressed between coacting takeup rolls 62, and then wound up at 64.

Figure 2:
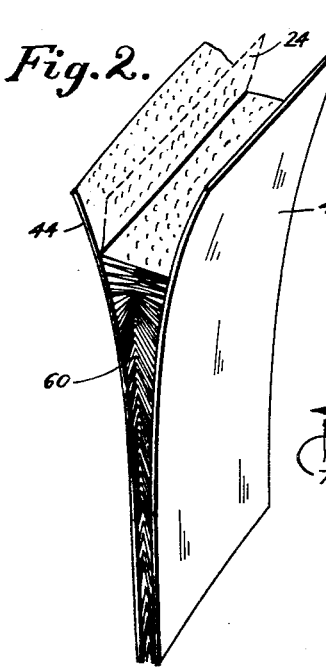
FIGURE 2 is an enlarged view of the heat insulating composite product of FIGURE 1.

An exemplary product of the invention is illustrated in FIGURE 2, wherein the cotton card web 24 is interlaid in closely adjacent folds 60 between the paper backing sheets 44, each fold being adhered at each end and along its entire length to the pressure sensitive adhesive facing surfaces of the backing sheets. The folds 60 may be spaced along the length of the backing sheets at intervals of for example 1/32", whereby a substantially continuous array of fibers extends between the backing sheets. This product, it will be recognized, has excellent heat insulating properties, and may be utilized as insulation for refrigerated containers and the like. The insulating material is light weight and occupies little volume, and as an added advantage may be readily compressed to less than 25% of its normal thickness for convenience in shipping, storage and the like, and to conserve space when its insulating properties are not being utilized. Upon being released from restraint, the composite may be readily expanded to original thickness without matting. The product may be expanded, for example, by pulling on the backing sheets in a manner which will tend to separate them. Expansion from compressed condition may be assisted and accelerated by the injection of pressure gas between the backing sheets. If the fibers constituting the filling are sufficiently resilient, the product may expand to original thickness automatically, when permitted.

When the original or normal thickness of the composite is less than the staple length of the filling fibers, a good percentage of the fibers will be adhered to both of the backing sheets. This circumstance insures that when the backing sheets are separated after compression of the product, the fibers adhered at both ends will be pulled into extended position and prevented from becoming matted with other fibers. Accordingly, when the maximum thickness of the composite does not exceed the staple length of the filling fiber, the product may be alternately compressed and expanded repeatedly without matting of the fibers.

Figure 3:
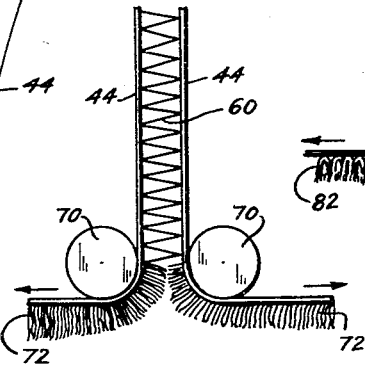
FIGURE 3 is a diagrammatic illustration of a further processing step, whereby the product of FIGURE 2 is converted into a pile fabric.

The composite product leaving the work station W, rather than being compressed, may be led between a pair of spaced rolls 70, as illustrated in FIGURE 3, and the backing sheets 44 pulled therefrom in opposite directions. The forcible separation of the backing sheets is effective to part the fiber folds therebetween, the folds parting easily and naturally to leave a soft, fluffy pile layer 72 on each backing sheet. The pile attached to each backing sheet constitutes a substantially continuous array of cotton fibers, each firmly attached to the backing sheet and extending therefrom in approximately normal direction. In this manner the composite product may be readily converted into two lengths of pile fabric of unusual properties and myriad uses. It is preferable for this purpose that the backing sheets be spaced apart in manufacture a distance equal to or greater than the staple length of the filling, so that the fibers will be adhered only to one backing sheet or the other. This will facilitate the separation of the backing sheets with a uniform amount of fiber on each sheet. As will be evident, the character of the pile product can be varied simply by varying the staple length of the filling sheet or the distance between the backing sheets.

Figure 4:
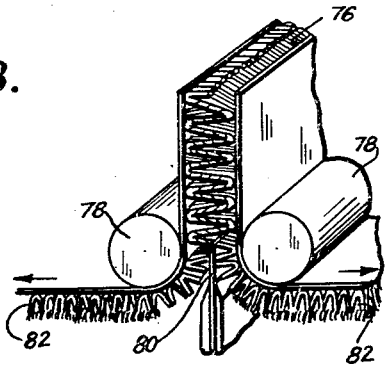
FIGURE 4 is a diagrammatic illustration of an alternative procedure, wherein a composite structure of different character is converted into a pile fabric.

In place of the card web of the preceding description, other filling sheets may be interlaid in zigzag fashion between the backing sheets. The filling sheet may, for example, be a warp or layer 76 of parallel continuous yarns, as shown in FIGURE 4. As will be evident, filling sheets of other character may be utilized in the invention as well, including woven and unwoven fabrics, plastic films etc. FIGURE 4 illustrates a composite structure in which the layer 76 of continuous yarns is folded between and joined to the backing sheets 44, precisely as in the case of the card web previously referred to. This composite structure may be conducted between a pair of spaced rolls 78, and the backing sheets led therefrom in opposite directions, as shown. A knife 80 or other suitable cutting element operatively disposed between the rolls 78 is adapted to sever the yarn layer folds of the composite as they pass between the rolls, to produce on each backing sheet a pile 82 of cut yarns. The pile 82, as will be understood, will comprise parallel rows of V-shaped yarn segments, each firmly attached at its apex to the backing sheet, the two yarn ends extending substantially normally therefrom. In this manner, pile products corresponding in appearance and function to carpet, velour and the like may be economically manufactured at high production rate.

A commercial machine constructed as an adjunct to a conventional cotton card for production of the laminated structure of FIGURE 2 is illustrated in FIGURES 5 to 11. In FIGURE 6, the card doffer cylinder 20 is mounted adjacent the delivery end of the doffer frame 90. In accordance with the present invention, an electric motor or other suitable source of power (not shown) is drivingly engaged, preferably through a clutch, to the reduction gear box 92, and the output shaft 94 of the gear box is in driving engagement through chain 96 with the doffer. The doffer, then, is driven through gear box 92, independently of the associated card.

The interlaying or laminating apparatus is mounted adjacent and in alignment with the delivery end of the doffer in a frame 98, and powered by the gear box 92, the common drive effectively coordinating the speeds of the doffer and laminating apparatus. As shown in FIGURE 6, the gear box output shaft 94 mounts a sprocket engaged by chain 100 to a similar sprocket mounted on the corresponding end of shaft 102, which carries the pressure roll 34. The pressure rolls 32 and 34 may be resiliently surfaced or constructed entirely of metal, and as shown in FIGURE 5 are mechanically engaged by gears 104, whereby they rotate at equal speeds in opposite directions. Pressure roll 32 is mounted on a shaft 106 which is journaled in end blocks 108 slidably retained in guideways 110 mounted on the inner surfaces of the frame walls 112 and 114. As shown in FIGURE 9, a spring 116 is active on each end block 108, whereby the shaft 106 and pressure roll 32 are resiliently biased and maintained in pressure contact with the coacting roll 34.

Shaft 102 is journaled in and extends through frame wall 114, and outside the frame wall carries a sprocket 120 (see FIGURES 8 and 10), which is engaged by chain 122 to a sprocket 124 mounted on the shaft 126, with which is associated the conveyor roller 30. The other conveyor roller 28, mounted on the doffer frame 90 as shown in FIGURE 6, is an idler, whereby the conveyor 26 is also driven in coordinated fashion.

Figure 11:
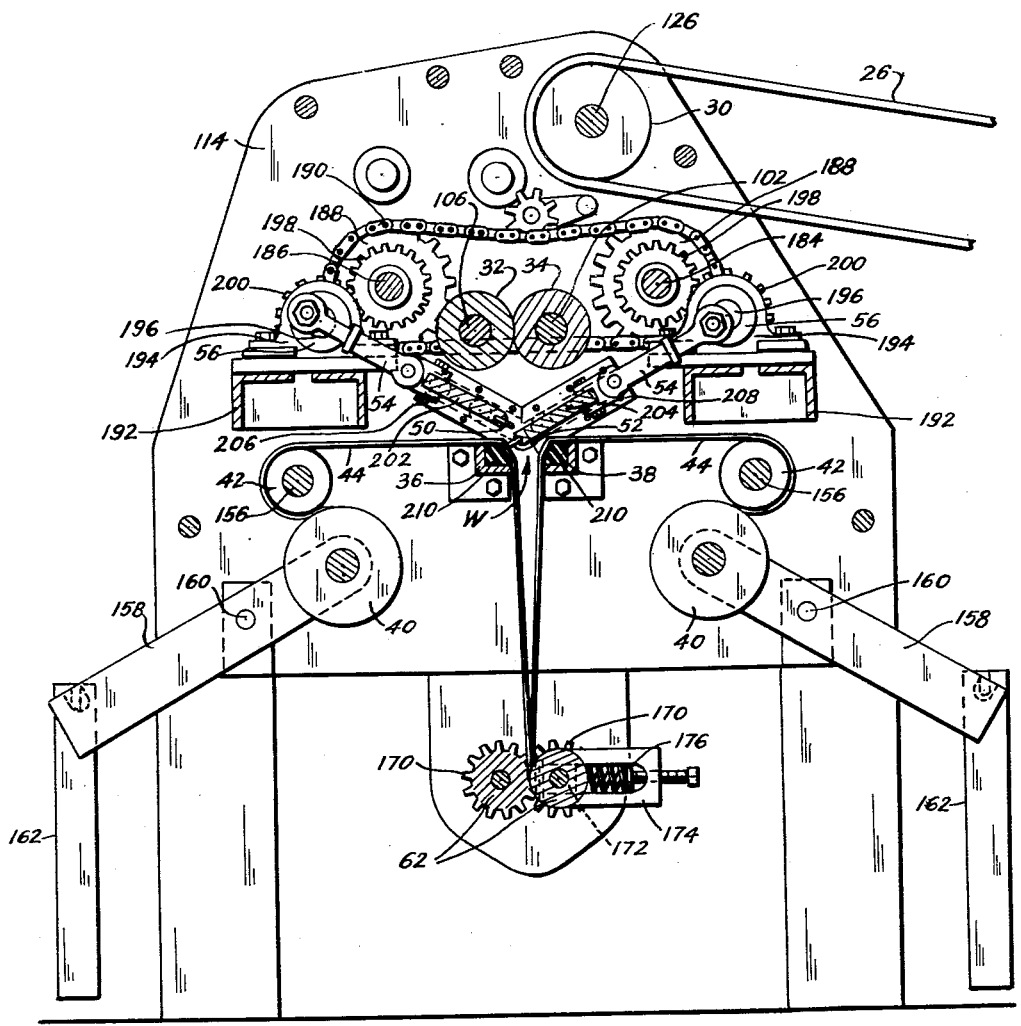
FIGURE 11 is a sectional view taken substantially on the line 11—11 of FIGURE 5.

A short space outside frame wall 114 is mounted a support wall 130, and stub shafts 132 and 134 are suitably journaled in the walls 114 and 130 and extend therebetween. As best shown in FIGURES 5 and 10, stub shaft 132 carries gears 136 and 138, and stub shaft 134 carries a gear 140 and sprocket 142. The driven conveyor roller shaft 126 carries a gear 144 which meshes with gear 136 and drives the stub shaft 132. Gear 138 on shaft 132 in turn meshes with gear 140, whereby the stub shaft 134 and its sprocket 142 are rotated. In this manner the rotary movement of shaft 126 is reduced and transmitted to the sprocket 142, which is engaged by chain 148 to the idler 150 and counterrotating sprockets 152 and 154. The sprockets 152 and 154 are mounted on the ends of shafts 156, which extend between the frame walls 112 and 114 and carry the feed rolls 42. As best shown in FIGURES 9 and 11, a stock roll 40 is rotatably mounted adjacent each feed roll, preferably by means of arms 158 pivotally mounted on the side walls as at 160. The outer ends of arms 158 may be heavily weighted with weights 162, whereby each stock roll 40 is maintained at all times in firm contact with its associated feed roll 42. The feed rolls are desirably rough surfaced, and may be of the type commonly referred to as "sand" rolls, these rolls cooperating with the firmly engaged stock rolls to unwind pressure sensitive adhesive coated stock in smooth and positive manner.

Just inside frame wall 112, one of the shafts 156 is engaged by sprockets and chain 168 (FIGURES 6 and 7) in driving relationship to one of the take-up rolls 62. The takeup rolls are geared together for counterrotation by gears 170 (FIGURES 9 and 11), and the roll not engaged by the chain 168 is resiliently mounted, in the manner of pressure roll 32, by means of an end block 172, guideway 174 and spring 176 at each end thereof. In this manner the takeup rolls are resiliently maintained in pressure contact and driven in coordination with the elements previously described.

As stated, the drive input to the laminating apparatus is through shaft 102. As shown in FIGURES 6 and 7, shaft 102 carries a gear 180 outside frame wall 112, this gear meshing with and driving a gear 182 mounted on the end of a shaft 184 which extends between the frame walls. A similar shaft 186 extends between the frame walls at a corresponding position on the opposite side of the pressure rolls 32, 34, and the shafts 184 and 186 are engaged for counterrotation by sprockets 188 and chain 190, located just inside the frame wall 114, as shown in FIGURES 9 and 11.

Somewhat below and outwardly of the shafts 184 and 186, supports 192 extend between the frame walls. These supports mount transversely spaced pairs of bearings 194, each aligned pair journaling a shaft 196 (see FIGURES 5 and 11). Substantially on the longitudinal center line of the apparatus, each of the shafts 184 is drivingly engaged by means of gears 198 and 200 in the adjoining shaft 196.

Substantially below the pressure rolls 32 and 34, a pair of rigid plates 202, 204 extends between the frame walls, the plates being slidably retained in inclined guideways 206, 208 mounted on the inside surfaces of the frame walls. At their lower ends, the plates 202, 204 carry, respectively, the outwardly extending blades 50, 52. Each shaft 196, outside its bearings 194, carries eccentrics 56, from which the crank links 54 extend to the plates 202 and 204. As shown in FIGURE 11, the plate 202 and its blade 50 are adapted to be reciprocated from the withdrawn position illustrated to forward position in contact with the backing member 38, and plate 204 with its blade 52 are adapted to be reciprocated from the forward position illustrated in contact with backing member 36 to withdrawn position remote from the backing member. The apparatus is assembled with the eccentrics 180° out of phase, so that the blades 50 and 52 are 180° out of phase, and contact their respective backing members alternately. The working surfaces of the backing members are desirably provided with rubber blocks 210, to enhance blade contact with the overlying backing sheets and accommodate any minor misalignment or unevenness of the blades.

Function and operation of the apparatus will be readily apparent from the foregoing description. Initially, a roll 40 of pressure sensitive adhesive coated paper is mounted in each pair of arms 158, and weighted against the adjoining feed roll. An adhesive surfaced backing layer is then unrolled from each roll and led around the appropriate feed roll and backing member and between the takeup rolls 62. With the associated card in operation, power is applied to the gear box 92, to start the doffer and the laminating apparatus. The card web 24 doffed by the comb 22 is carried across the upper flight of the conveyor 26, and then led downwardly to the pressure rolls 32, 34. The resilient mounting of pressure roll 32 simplifies separation of the rolls to thread the web therebetween. The web leaving the pressure rolls 32, 34 is led between the blades 50, 52, and into contact with one of the backing sheets 44.

The speeds of conveyor 26 and pressure rolls 32, 34 will ordinarily exceed the rate of web production very slightly, to maintain control of the web. The operation of blades 50 and 52 is coordinated with the feed of the filling sheet and the distance between their lines of contact with their respective backing members, whereby a fold of filling sheet is laid against a backing member when the appropriate length of filling sheet has been provided. The feed of the backing sheets is necessarily at a rate lower than that of the feed of the filling sheet, and may be varied according to requirements. For production of the article of FIGURE 2, the feed of the backing sheets may be adjusted, for example, so that successive blade contacts against each backing sheet are about 1/32" apart.

The composite is taken up and compressed by the takeup rolls 62, and may then be rolled up or otherwise handled. If wet adhesive is used, the time of passage from the backing member to the takeup rolls will ordinarily afford adequate time for drying. All operative elements are positively driven, and speed coordination is simplified by the common drive disclosed.

It will thus be seen that there has been provided by this invention methods and structure in which the various objects hereinbefore set forth, together with many practical advantages, are successfully achieved. As various possible embodiments may be made of the novel features of the invention, all without departing from the scope thereof, it is to be understood that all matter hereinbefore set forth or shown in the accompanying drawings is to be interpreted as illustrative, and not in a limiting sense.

What is claimed is:

1. In combination, a pair of backing members disposed in spaced alignment, means for feeding an adhesive coated backing sheet over each of said members whereby the adhesive surfaces of said backing sheets are disposed in generally facing relationship, means for feeding a fiber web between said backing members at a speed coordinated with the feed of said backing sheets, a reciprocating blade disposed generally above each of said backing members and adapted for movement into pressure contact with the opposed backing member, and means operatively linking said blades whereby they contact their respective cooperative backing members alternately, said blades being adapted to fold said fiber web alternately against said backing members whereby said fiber web is adhered alternately to said backing sheets and extends therebetween in zigzag fashion.

2. In combination, a cotton card, a pair of backing members disposed in spaced alignment adjacent the delivery end of said card, means for feeding an adhesive coated paper sheet over each of said backing members whereby the adhesive surfaces of said backing paper sheets are disposed in generally facing relationship, conveyor means for carrying the cotton web delivered by said card to a position above said backing members, a pair of coacting pressure rolls disposed below the delivery end of said conveyor and adapted to compress and guide said card web, a reciprocating blade disposed generally above each of said backing members and adapted for movement into pressure contact with the opposed backing member, means operatively linking said blades whereby they contact their respective cooperative backing members alternately, said blades being adapted to fold said card web alternately against said backing members whereby said card web is adhered alternately to said paper sheets and extends therebetween in zigzag fashion, and means for coordinating the drive of said card, said paper sheet feeding means, said conveyor means, said pressure rolls and said reciprocating blades.

3. The combination of claim 1, including a pair of coacting pressure rolls trailing said backing members and adapted to take up the composite structure.

4. The combination of claim 1, including means trailing said backing members and adapted to separate said backing sheets whereby the fiber web folds therebetween are parted, each backing sheet retaining an array of fibers extending substantially normally from one surface thereof.

5. In combination, a pair of backing members disposed in spaced alignment, means for feeding an adhesive coated backing sheet over each of said members whereby the adhesive surfaces of said backing sheets are disposed in generally facing relationship, means for feeding a filling sheet between said backing members at a speed coordinated with the feed of said backing sheets, a movable element disposed generally above each of said backing members and adapted for movement into and out of pressure contact with the opposed backing member, and means operatively linking said elements whereby they contact their respective cooperative backing members alternately, said elements being adapted to fold said filling sheet alternately against said backing members whereby said filling sheet is adhered alternately to said backing sheets and extends therebetween in zigzag fashion.

6. The combination of claim 5, wherein said filling sheet comprises a layer of continuous yarns.

7. The combination of claim 6, including cutting means trailing said backing members and adapted to sever the yarn layer folds between said backing sheets, each backing sheet retaining a pile of cut yarns extending substantially normally from one surface thereof.

8. The combination of claim 5, including means for applying adhesive to said backing sheets at positions leading said backing members.

References Cited in the file of this patent

UNITED STATES PATENTS

| | | |
|---|---|---|
| 1,864,478 | Ward | June 21, 1932 |
| 2,160,154 | Kellogg et al. | May 30, 1939 |
| 2,248,135 | Stoddard | July 8, 1941 |
| 2,409,951 | Nootens | Oct. 22, 1946 |
| 2,480,316 | Blair et al. | Aug. 30, 1949 |
| 2,505,404 | Jacobsen | Apr. 25, 1950 |
| 2,737,227 | Brummel | Mar. 6, 1956 |